(12) United States Patent
Yang (10) Patent No.: US 7,860,010 B2
(45) Date of Patent: Dec. 28, 2010

(54) METHOD, APPARATUS AND SYSTEM FOR DETECTING SEQUENCE NUMBER OF PACKET FOR TRANSMISSION OF MULTI-UNITS

(75) Inventor: Yinzhu Yang, Hangzhou (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 118 days.

(21) Appl. No.: 12/282,780

(22) PCT Filed: Jul. 28, 2006

(86) PCT No.: PCT/CN2006/001894

§ 371 (c)(1),
(2), (4) Date: Sep. 12, 2008

(87) PCT Pub. No.: WO2007/104192

PCT Pub. Date: Sep. 20, 2007

(65) Prior Publication Data

US 2009/0080463 A1    Mar. 26, 2009

(30) Foreign Application Priority Data

Mar. 14, 2006    (CN) ................... 2006 1 0064820

(51) Int. Cl.
*H04J 1/16*    (2006.01)
*H04L 12/28*    (2006.01)

(52) U.S. Cl. .................. 370/235; 370/394

(58) Field of Classification Search ........ 370/230, 370/235, 392, 394
See application file for complete search history.

(56) References Cited

U.S. PATENT DOCUMENTS

| 6,788,699 B1 * | 9/2004 | Yoshikawa ............. 370/417 |
| 6,978,384 B1 | 12/2005 | Milliken |
| 7,069,490 B2 * | 6/2006 | Niu et al. ............. 370/394 |
| 7,161,978 B2 * | 1/2007 | Lu et al. ............. 375/219 |
| 7,406,087 B1 * | 7/2008 | Quach et al. ............. 370/401 |

(Continued)

FOREIGN PATENT DOCUMENTS

CN    1390019 A    1/2003

(Continued)

OTHER PUBLICATIONS

Yan Cong, et al; "Principle and Implementation of Anti-Replay of IPSec" Journal of Hunan Institute of Engineering vol. 13, No. 4, Dec. 2003, pp. 68-70 International Search Report, mailed Jan. 4, 2007; PCT/CN2006/001894.

*Primary Examiner*—Andrew Lee
(74) *Attorney, Agent, or Firm*—Ladas & Parry LLP (57) ABSTRACT

The present invention discloses a method for detecting sequence number of the packet during multi-units sending process, wherein all of the sequence numbers of the packets are pre-divided into non-overlapping subsets, the number of the subsets being at least equal to the number of units comprised by the sending party, and each subset is assigned to a unit; the receiving party determines a sliding window according to each subset, and records the correlation between the sliding window and the sequence number subset; then, the receiving party determines whether the packet is a valid packet according to the correlation and the sequence number of the packet sent from the sending party. At the same time, the invention discloses a packet sending device, a packet receiving device, and a system for detecting sequence number of the packet during multi-units sending process. With the invention, the sequence numbers of the packets sent by the units of the sending party are not overlapped, and after the receiving party receives a packet, it finds the corresponding sliding window according to the sequence number and detects the validity of the packet, so that the accuracy of packet validity detection may be improved, and packet loss may be avoided.

12 Claims, 5 Drawing Sheets

U.S. PATENT DOCUMENTS

| | | |
|---|---|---|
| 7,411,903 B2 * | 8/2008 | Jang et al. .................. 370/230 |
| 7,580,411 B2 * | 8/2009 | Wen et al. .................. 370/394 |
| 2003/0227933 A1 * | 12/2003 | Eberle et al. ................ 370/419 |
| 2004/0086051 A1 * | 5/2004 | Mizoguchi ............. 375/240.28 |
| 2004/0202110 A1 * | 10/2004 | Kim .......................... 370/235 |
| 2005/0047525 A1 * | 3/2005 | Lee ........................... 375/316 |
| 2005/0182833 A1 * | 8/2005 | Duffie et al. ................ 709/224 |
| 2006/0198300 A1 * | 9/2006 | Li et al. ..................... 370/229 |

FOREIGN PATENT DOCUMENTS

| | | |
|---|---|---|
| CN | 1400787 A | 3/2003 |
| CN | 1520111 A | 8/2004 |
| CN | 1604570 A | 4/2005 |
| CN | 1689287 A | 10/2005 |
| JP | 2005-260520 A | 9/2005 |

* cited by examiner

METHOD, APPARATUS AND SYSTEM FOR DETECTING SEQUENCE NUMBER OF PACKET FOR TRANSMISSION OF MULTI-UNITS

FIELD OF THE INVENTION

The present invention relates to the technical field of data transmission, in particular, to a method, a device and a system for detecting packet sequence number during multi-units sending process.

BACKGROUND OF THE INVENTION

Figure 1:
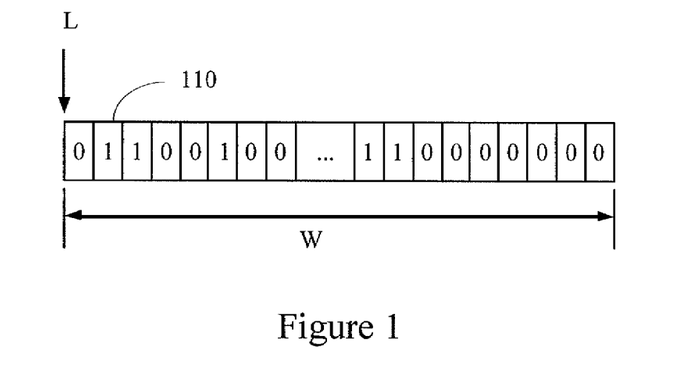
FIG. 1 is a schematic diagram showing the structure of the sliding window in the prior art.

In the field of data communications, two communication parties usually use a packet sequence number to identify the uniqueness of a packet. The sending party maintains a sending sequence number state and updates the sending sequence number state each time when a packet is sent. The receiving party maintains a receiving sequence number state and updates the receiving sequence number state each time when a packet is received. The actual content of the sequence number state is relevant to the communication protocol. However, the sequence number state of the sending party usually includes a sequence number to be used by the next packet to be sent. Because a packet needs to be forwarded by a plurality of apparatus before it reaches the receiving party, different packets may pass through different links and apparatus, and the arrival order of the packet to the receiving party may be different from the sending order of the sending party. Therefore, the receiving party employs a sliding window to record the receiving sequence number state. As shown in FIG. 1, the sliding window usually has a certain window width W. The sliding window includes a left window border L and a plurality of small windows 110, and may also include a right window border (not shown). The left window border L corresponds to the minimal packet sequence number that may be accepted by the receiving party. Corresponding to the sending order of the packet sequence number, each small window 110 corresponds to a packet sequence number; and each time when a sequence number is received, the corresponding sequence number on the window is marked as Received. For example, it may be marked as 1. The window width W is less than or equal to the width of the packet sequence number that may be accepted by the receiving party, and the window width W may be fixed or variable.

Figure 2:
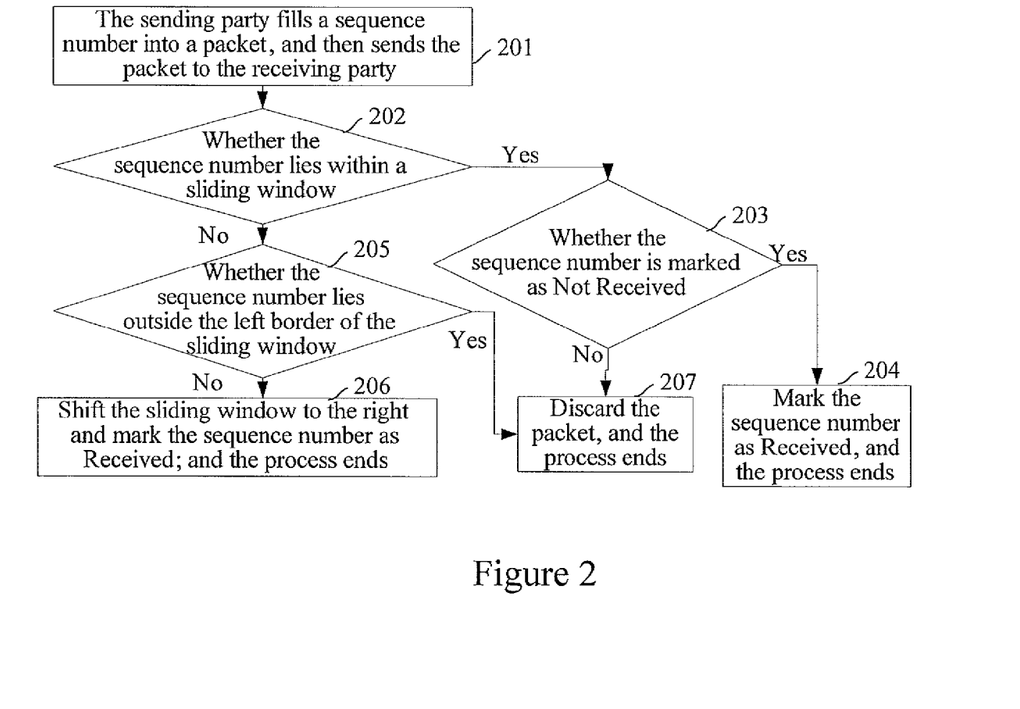
FIG. 2 is a flow chart of the process for detecting packet sequence number during a single-unit sending process in the prior art.

IPsec is an IP security protocol, which provides a confidential, complete, real and anti-replay security service for communication data on the IP layer of TCP/IP protocol stack. At present, IPsec is one of the most reliable security technologies. According to the IPsec protocol, two communication parties determine the Security Association (SA) parameter via Internet Key Exchange (IKE), and take the SA parameter as the sequence number of the IPsec packet. To realize anti-replay, the sending party increases the SA sequence number by 1 each time when an SA is used for sending a packet, so that the SA may be used for sending the next packet. FIG. 2 is a flow chart of the process for delivering an IPsec packet in the prior art. As shown in FIG. 2, it has the following specific steps:

Step 201: The sending party fills a packet sequence number into a packet to be sent, and then sends the packet to the receiving party.

Step 202: After receiving the packet, the receiving party determines whether the packet sequence number lies within a sliding window, if yes, turns to Step 203; otherwise, turns to Step 205.

Step 203: The receiving party determines whether the packet sequence number is marked as Not Received on the sliding window, if yes, turns to Step 204; otherwise, turns to Step 207.

Step 204: The receiving party determines that the packet is a valid packet, and marks the packet sequence number as Received on the sliding window, and the process ends.

Step 205: The receiving party determines whether the packet sequence number lies outside the left border of the sliding window, if yes, turns to Step 207; otherwise, turns to Step 206.

Step 206: The receiving party determines that the packet is a valid packet, and at the same time, it determines that the packet sequence number lies outside the border corresponding to the sum of the left border of the sliding window and the window width; the receiving party shifts the sliding window to the right so as to make the sliding window include the packet sequence number, and marks the packet sequence number as Received on the sliding window; and the process ends.

Step 207: The receiving party determines that the packet is an invalid packet, and discards the packet, and the process ends.

Figure 3:
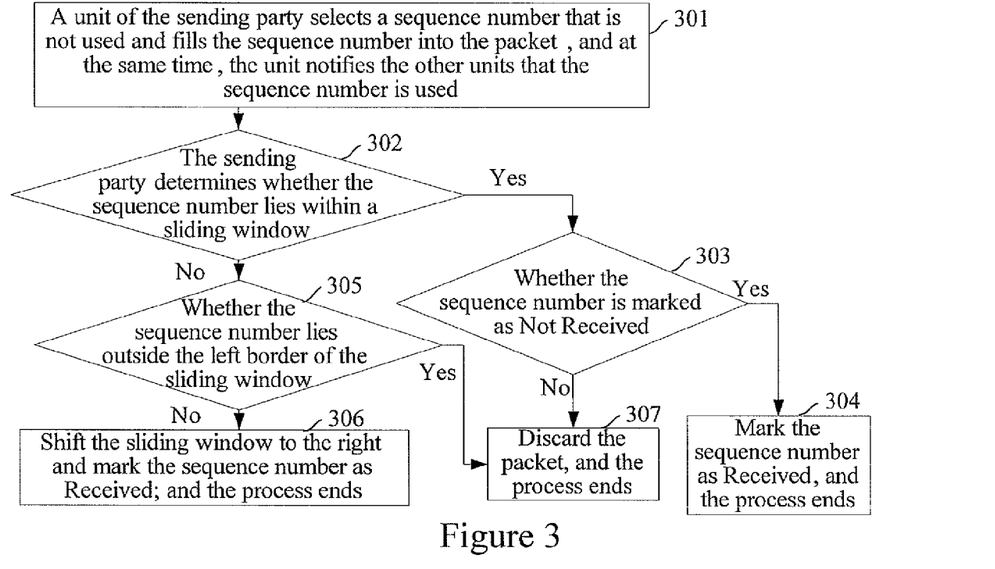
FIG. 3 is a flow chart of the process for detecting packet sequence number during a multi-units sending process in the prior art.

The above method is only applicable for the case in which the sending party employs one unit to process the data of the same connection. When the sending party employs a plurality of units to process the data of the same connection, if the plurality of units use the same sequence number set, the packet sequence number sent by one unit may be the same as the packet sequence number sent by another unit, and the receiving party may receive a plurality of packets with the same sequence number from the plurality of units. Therefore, when a packet with a certain sequence number is received from one unit after a packet with the same sequence number is received from another unit, it will be regarded in error that the packet has been received when a sliding window detection is performed, so the packet received later will be discarded. In the prior art, to solve this problem, the sending party employs the following method: when each unit sends a packet, it notifies other units that a packet sequence number is used; the other units know that this sequence number is used, so they will not again employ this sequence number to send a packet in the subsequent sending process. As shown in FIG. 3, the specific process includes the following steps:

Step 301: A unit of the sending party determines to send a packet, selects a packet sequence number that is not used according to the general set of packet sequence numbers stored in this unit and the used packet sequence number sets sent from other units, fills this packet sequence number in the packet, and then sends the packet to the receiving party. Meanwhile, this unit notifies the other units that the packet sequence number is used.

Steps 302-307 are the same as Steps 202-207.

The disadvantage of the method lies in that: the message load of the system is increased, and packet loss may also be caused. Because when the sending party has many units, the sending sequence and the sending rate of each unit is different, and the message for notifying that a packet sequence number is used has a time delay, the following situation may most likely appear: unit A has just used a sequence number to send a packet, and the time for unit B to send the next packet has come before the information sent by unit A, which indicates that the sequence number is used, reaches unit B, so unit B may use the same sequence number as unit A to send the next packet, thus packet loss may be caused.

SUMMARY OF THE INVENTION

The invention provides a method for detecting packet sequence number during multi-units sending process, by means of which the accuracy of packet validity detection may be improved and packet loss may be avoided when the sending party includes a plurality of units.

The invention provides a multi-units packet sending device, a packet receiving device used during multi-units sending process and a system for detecting packet sequence number during multi-units sending process, so that the accuracy of packet validity detection may be improved.

According to an aspect of the invention, there is provided a method for detecting a packet during multi-units sending process, wherein all of the packet sequence numbers are divided into non-overlapping subsets, the number of the subsets being at least equal to the number of units comprised in a sending party; each subset is assigned to a unit of the sending party; and a receiving party records a correlation between each sequence number subset and a sliding window; the method comprises:

filling, by a unit of the sending party, a sequence number from its subset into a packet to be sent, and sending the packet to the receiving party;

determining, by the receiving party, the sliding window corresponding to the packet sequence number according to the correlation between the sliding window and the sequence number subset recorded in the receiving party after the packet is received, and performing packet validity detection according to the determined sliding window and the sequence number.

Optionally, the process of determining the sliding window corresponding to the packet sequence number specifically comprises:

searching, by the receiving party, for the sequence number subset to which the sequence number pertains according to the packet sequence number, and obtaining the sliding window corresponding to the sequence number subset according to the correlation between the sliding window and the sequence number subset; or computing, by the receiving party, a serial number of the sliding window corresponding to the packet sequence number, so as to find the sliding window corresponding to the serial number of the sliding window, when the correlation between the sliding window and the sequence number subset is a correlation between the serial number of the sliding window and the sequence number in the sequence number subset.

Optionally, the process in which the sequence number is divided into non-overlapping subsets, the number of the subsets being at least equal to the number of units comprised in the sending party, specifically comprises: arranging all of the sequence numbers in turn, and assigning each sequence number to each subset in a round robin mode; and the process of determining the sliding window corresponding to the packet sequence number specifically comprises: determining, by the receiving party, that the sliding window corresponding to the packet sequence number is a sliding window corresponding to each subset jointly.

Optionally, the process of filling, by the unit of the sending party, the sequence number from its subset into the packet to be sent specifically comprises:

computing, by the unit, a current packet sequence number according to a packet sequence number sent previously and a relation between two neighboring sequence numbers in the subset in which the sequence number exists, and filling the current packet sequence number into the packet to be sent; or selecting, by the unit, a sequence number following the sequence number of the packet sent previously from its sequence number subset, and filling the selected sequence number into the packet to be sent.

Optionally, the process of performing packet validity detection according to the determined sliding window and the sequence number specifically comprises:

determining that the packet is a valid packet, and marking the sequence number as Received in the sliding window, when the sequence number lies within the sliding window and the sequence number is marked as Not Received on the sliding window;

determining that the packet is an invalid packet and discarding the packet, when the sequence number lies within the sliding window and the sequence number is marked as Received on the sliding window;

determining that the packet is an invalid packet and discarding the packet, when the sequence number lies outside the left border of the sliding window; and determining that the packet is a valid packet, shifting the sliding window to the right to contain the sequence number, and marking the sequence number as Received on the sliding window, when the sequence number does not lie within the sliding window and does not lie outside the left border of the sliding window.

According to another aspect of the invention, there is provided a method for detecting a packet during multi-units sending process, wherein all of the packet sequence numbers are divided into non-overlapping subsets, the number of the subsets being at least equal to the number of units comprised in a sending party, and each subset is assigned to a unit of the sending party; the method comprises:

filling, by a unit of the sending party, a sequence number from its subset into a packet to be sent, and sending the packet to a receiving party; and determining, by the receiving party, a sequence number subset in which the packet sequence number exists after the packet is received, and performing packet validity detection according to a receiving state of the sequence number subset and the sequence number.

According to a further aspect of the invention, there is provided a packet sending device used during multi-units sending process, comprising a sequence number subset assigning unit of sending party and at least two sending units, wherein:

the sequence number subset assigning unit of sending party is adapted to divide a sequence number set into non-overlapping sequence number subsets, the number of the subsets being at least equal to the number of the sending units, according to a sequence number assignment rule which is the same as that of a receiving party, and then assign a sequence number subset to each sending unit; and the sending unit is adapted to fill a sequence number from the sequence number subset assigned by the sequence number subset assigning unit of sending party into a packet when the packet is to be sent, and then send the packet to a receiving unit.

According to still another aspect of the invention, there is provided a packet receiving device used during multi-units sending process, comprising a sequence number subset assigning unit of receiving party and a receiving unit wherein:

the sequence number subset assigning unit of receiving party is adapted to divide a sequence number set into non-overlapping sequence number subsets, the number of the subsets being at least equal to the number of the sending units, according to a sequence number assignment rule which is the same as that of a sending party, and then send each sequence number subset to the receiving unit; and the receiving unit is adapted to save a correlation between the sequence number subset and a sliding window according to the sequence number subset sent from the sequence number subset assigning unit of receiving party, and perform validity detection on a packet sent from a sending unit after the packet is received according to the sliding window corresponding to the packet sequence number and the sequence number.

Optionally, the receiving unit comprises a sliding window determining unit and a sequence number detecting unit, wherein:

the sliding window determining unit is adapted to determine a sliding window according to the sequence number subset sent from the sequence number subset assigning unit of receiving party, and send the correlation between the sequence number subset and the sliding window to the sequence number detecting unit; and the sequence number detecting unit is adapted to search for a sliding window corresponding to the packet sequence number according to the correlation between the sequence number subset and the sliding window saved in the receiving unit obtained from the sliding window determining unit after a packet sent from the sending unit is received, and then perform validity detection on the packet according to the sliding window and the packet sequence number.

According to another aspect of the invention, there is provided a system for detecting a packet during multi-units sending process, comprising a packet sending device and a packet receiving device, wherein the packet sending device comprises a sequence number subset assigning unit of sending party and at least two sending units; the packet receiving device comprises a sequence number subset assigning unit of receiving party and a receiving unit; wherein:

the sequence number subset assigning unit of sending party is adapted to divide a sequence number set into non-overlapping sequence number subsets, the number of the subsets being at least equal to the number of the sending units, according to a sequence number assignment rule which is the same as that of a receiving party, and then assign a sequence number subset to each sending unit;

the sending unit is adapted to fill a sequence number from the sequence number subset assigned by the sequence number subset assigning unit of sending party into a packet when the packet is to be sent, and then send the packet to the receiving unit;

the sequence number subset assigning unit of receiving party is adapted to divide a sequence number set into non-overlapping sequence number subsets, the number of the subsets being at least equal to the number of the sending units, according to a sequence number assignment rule which is the same as that of the sending party, and then send each sequence number subset to the receiving unit; and the receiving unit is adapted to save the correlation between the sequence number subset and the sliding window according to the sequence number subset sent from the sequence number subset assigning unit of receiving party, and perform validity detection on a packet according to the sliding window corresponding to the packet sequence number and the sequence number after the packet sent from any sending unit is received.

Optionally, the receiving unit comprises a sliding window determining unit and a sequence number detecting unit, wherein:

the sliding window determining unit is adapted to determine a sliding window according to the sequence number subset sent from the sequence number subset assigning unit of receiving party, and send the correlation between the sequence number subset and the sliding window to the sequence number detecting unit; and the sequence number detecting unit is adapted to search for a sliding window corresponding to the packet sequence number according to the correlation between the sequence number subset and the sliding window saved in the receiving unit obtained from the sliding window determining unit after a packet sent from the sending unit is received, and then perform validity detection on the packet according to the sliding window and the packet sequence number.

According to a further aspect of the invention, there is provided a device for detect a packet during multi-units sending process, comprising a sequence number subset assigning unit, at least two sending units and a receiving unit, wherein:

the sequence number subset assigning unit is adapted to divide a sequence number set into non-overlapping sequence number subsets, the number of the subsets being at least equal to the number of the sending units, and then assign a sequence number subset to each sending unit or send each sequence number subset to the receiving unit;

the sending unit is adapted to fill a sequence number from the sequence number subset assigned by the sequence number subset assigning unit into a packet when the packet is to be sent, and then send the packet to the receiving party; and the receiving unit is adapted to save the correlation between the sequence number subset and the sliding window according to the sequence number subset sent from the sequence number subset assigning unit, and perform validity detection on a packet according to the sliding window corresponding to the packet sequence number and the sequence number after the packet from the sending party is received.

In comparison with the prior art, in the invention, sequence numbers are pre-divided into non-overlapping subsets, the number of the subsets being at least equal to the number of units contained in the sending party, and each subset is assigned to a unit; the receiving party determines a sliding window according to each subset, and records the correlation between the sliding window and the sequence number subset; after receiving the packet, the receiving party searches for the sliding window corresponding to the packet sequence number according to the correlation between the sliding window and the sequence number subset recorded in the receiving party, and then determines whether the packet is a valid packet according to the obtained sliding window and the sequence number. With the invention, the packet sequence numbers sent by the units of the sending party are not overlapped, and after receiving a packet, the receiving party finds the corresponding sliding window according to the sequence number and performs packet validity detection, so that the accuracy of packet validity detection may be improved, and packet loss may be avoided.

DETAILED DESCRIPTION OF THE EMBODIMENTS

The invention will now be further illustrated in detail in conjunction with the drawings and the specific embodiments.

Figure 4:
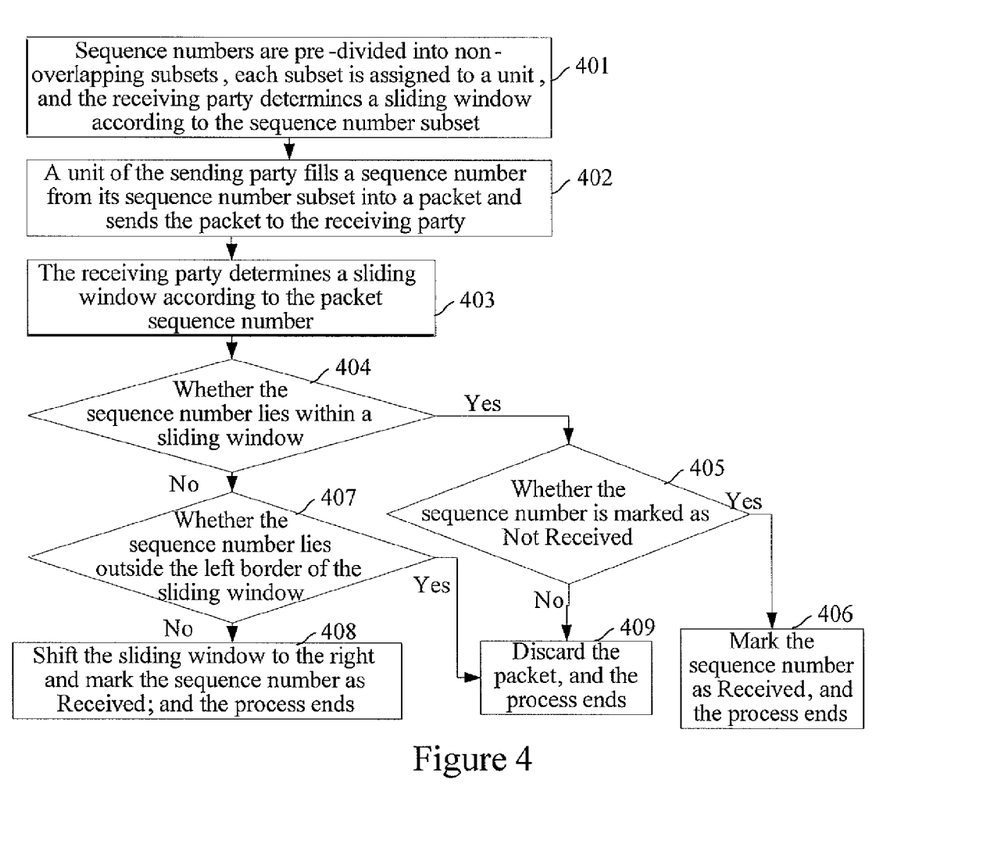
FIG. 4 is a flow chart of the process for detecting packet sequence number during a multi-units sending process according to the invention.

FIG. 4 is a flow chart of the process for detecting packet sequence number during the multi-units sending process according to the invention. As shown in FIG. 4, it contains the following specific steps:

Step 401: Packet sequence numbers are pre-divided into non-overlapping subsets, the number of the subsets is at least equal to the number of units included in the sending party, and the sequence numbers included in each subset are assigned to a unit; the receiving party determines a sliding window according to each sequence number subset, and records the correlation between the sliding window and the sequence number subset.

The determination of the sequence number set and the division of the subsets may be configured according to a certain rule. If the protocol itself has a negotiation mechanism for the determination of the sequence number set and the division of the subsets, the sequence number set is determined and divided into subsets according to the negotiation mechanism, and the receiving party can know the sequence number set and the divided subsets according to the negotiation mechanism.

The receiving party may determine a sliding window for a sequence number subset corresponding to each unit of the sending party, in other words, the number of sliding windows is the same as that of sequence number subsets. Alternatively, if the packet sending rate of each unit of the sending party is the same, and the division of the sequence number subsets is realized by assigning the sequence numbers in the general set to each unit in turn in a round robin mode after the sequence numbers are arranged orderly, the receiving party may use only one sliding window to detect the packets sent from all the units of the sending party. For example, the sending party has three units: unit 1, unit 2 and unit 3, and the sequence number general set is M={1, 2, 3, 4, 5, 6}, the sequence number set of unit 1 may be A={1, 4}, the sequence number set of unit 2 may be B={2, 5}, and the sequence number set of unit 3 may be C={3, 6}, thus the receiving party may use a sliding window with a left border of 1 and a width of 6 to detect the packets sent from the three units of the sending party.

The sequence number of each subset should not be overlapped; in other words, one sequence number belongs to one subset uniquely.

Step 402: A unit of the sending party fills a sequence number from its sequence number subset into a packet to be sent, and then sends the packet to the receiving party.

When sending the packet, the unit of the sending party may take a sequence number from its sequence number subset in turn and fill it into the packet. Alternatively, for a certain unit of the sending party, if a certain computation rule is met between two neighboring sequence numbers of the packets sent by this unit, the unit only needs to save the first sequence number and the computation rule of its sequence number subset. Each time when a packet is sent, the unit may compute the next packet sequence number according to the computation rule. Similarly, the receiving party may also computes the sliding window to which the sequence number pertains according to the received packet sequence number. For example, the receiving party may assign an incremental sequence number set $\{a, b\}$ to m subsets, Seq(0) to Seq(m−1), in turn in a round robin mode, wherein Seq(0)=$\{a, a+m, a+2*m, a+3*m, \ldots, a+n*m\}$, Seq(1)=$\{a+1, a+m+1, a+2*m+1, \ldots, a+n*m+1\}$, $\ldots$, and Seq(i)=$\{a+i, a+2*m+i, \ldots, a+n*m+i\}, \ldots$; each subset Seq(i) corresponds to one unit i, and at the same time, each subset Seq(i) corresponds to one sliding window i. Thus, for a certain unit, if the current packet sequence number is Seq, it may know that the next packet sequence number will be Seq+m. When the receiving party receives the packet, it may know that the subset to which the sequence number Seq pertains is (Seq−a) % m, and it may perform detection using sliding window (Seq−a) % m.

Step 403: After receiving the packet, the receiving party searches for the sliding window corresponding to the sequence number included in the packet according to the correlation between the sliding window and the sequence number subset recorded in the receiving party.

Step 404: The receiving party determines whether the sequence number searched lies within the sliding window, if yes, turns to Step 405; otherwise, turns to Step 407.

Step 405: The receiving party determines whether the packet sequence number is marked as Not Received in the sliding window, if yes, turns to Step 406; otherwise, turns to Step 409.

Step 406: The receiving party determines that the packet is a valid packet, and marks the packet sequence number as Received in the sliding window, and the process ends.

Step 407: The receiving party determines whether the packet sequence number lies outside the left border of the sliding window, if yes, turns to Step 409; otherwise, turns to Step 408.

Step 408: The receiving party determines that the packet is a valid packet, and determines that the packet sequence number lies outside a border obtained by adding the width of the sliding window to the left border of the sliding window, thus the receiving party shifts the sliding window to the right to include the sequence number and marks the packet sequence number as Received in the sliding window, and the process ends.

Step 409: The receiving party determines that the packet is an invalid packet and discards the packet, and the process ends.

Wherein, the multi-units sending process means a packet sending process in which the sending party has two or more units.

A specific embodiment will be given below, where the sending party has two units.

Figure 5:
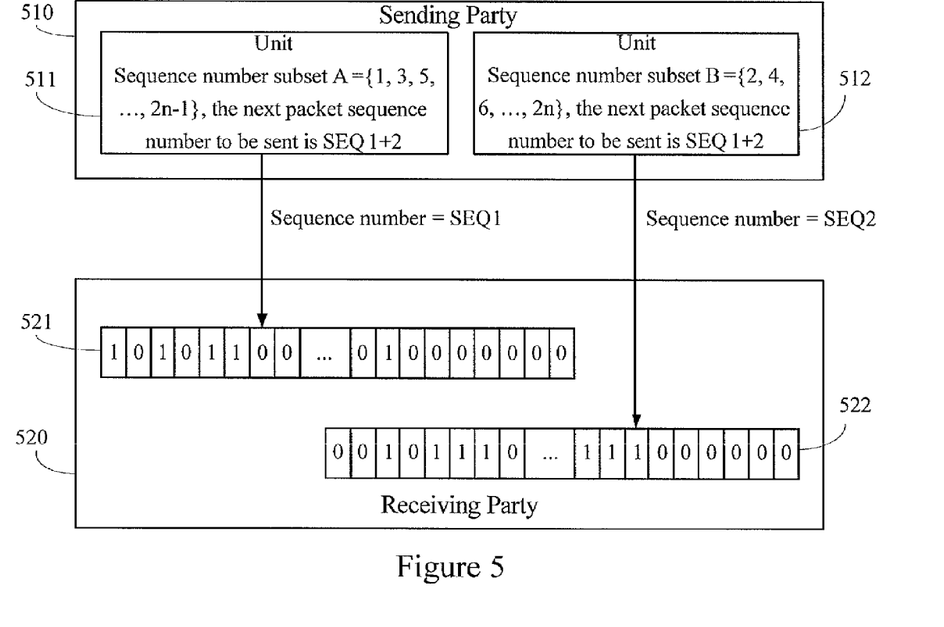
FIG. 5 is a schematic diagram of the process for detecting packet sequence number during a multi-units sending process according to an embodiment of the invention.

As shown in FIG. 5, a sending party 510 has two units, unit 511 and unit 512, and the packet sequence numbers of the sending party are 1 to 2n, wherein n is an integer, thus the packet sequence numbers are divided into two subsets: A={1, 3, 5, ..., 2n−1} and B={2, 4, 6, ..., 2n}, and A is taken as the sending packet sequence number set of unit 511, B is taken as the sending packet sequence number set of unit 512. At the same time, a receiving party 520 determines that the sliding window 521 of the set A has a left border of 1 and an overall width of n, and the sliding window 522 of the set B has a left border of 2 and an overall width of n, according to the packet sequence number set of unit 511 and unit 512. Then, when unit 511 sends a packet for the first time, it fills a sequence number 1 into the packet and computes that the next sequence number is 3; when the unit 512 sends a packet for the first time, it fills a sequence number 2 into the packet and computes that the next sequence number is 4. After the receiving party 520 receives a packet, if it is detected that the packet sequence number is an odd number, it may know that the packet comes from the unit 511, and the sliding window 521 will be used for performing packet validity detection; if it is detected that the packet sequence number is an even number, it may know that the packet comes from the unit 512, and the sliding window 522 will be used for performing packet validity detection.

Figure 6:
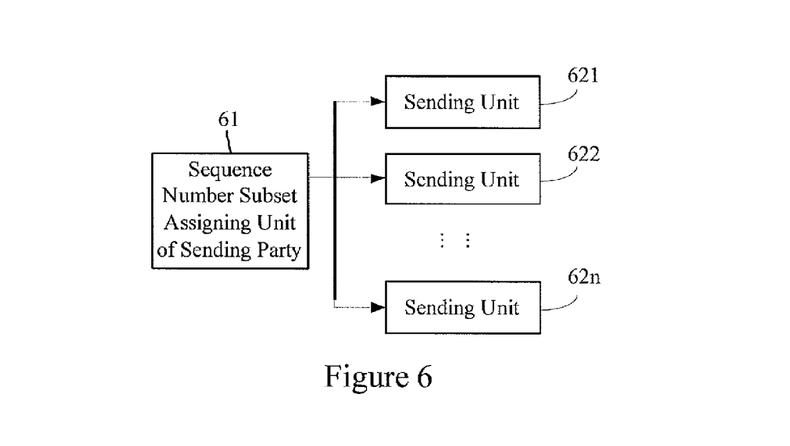
FIG. 6 is a block diagram of a packet sending device used during the multi-units sending process according to an embodiment of the invention.

FIG. 6 is a block diagram of a packet sending device used during the multi-units sending process according to the invention. As shown in FIG. 6, the packet sending device mainly includes a sequence number subset assigning unit of sending party 61 and at least two sending units 621-62n.

The sequence number subset assigning unit of sending party 61 is adapted to divide a sequence number set into non-overlapping sequence number subsets, the number of the subsets being at least equal to the number of the sending units, according to a sequence number assignment rule which is the same as that of the receiving party, and then assign a sequence number subset to each sending unit.

The sequence number subset assigning unit of sending party 61 may assign the sequence number subset to each sending unit 621-62n immediately after the sequence number set are divided; or may send the sequence number from the corresponding sequence number subset to the sending units 621-62n when the sending units 621-62n send a packet.

The sending units 621-62n are adapted to fill a sequence number sent from the sequence number subset assigning unit of sending party 61 into a packet when the packet is to be sent, and then sends the packet to the receiving party.

Here, n is an integer greater than 1.

Figure 7:
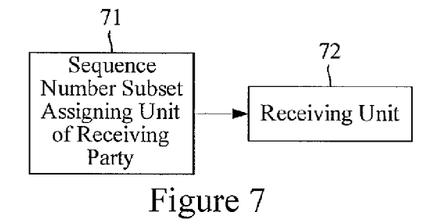
FIG. 7 is a block diagram of a packet receiving device used during the multi-units sending process according to an embodiment of the invention.

FIG. 7 is a block diagram of a packet receiving device used during the multi-units sending process according to an embodiment of the invention. As shown in FIG. 7, the packet receiving device mainly includes:

a sequence number subset assigning unit of receiving party 71, which is adapted to divide a sequence number set into non-overlapping sequence number subsets, the number of the subsets being at least equal to the number of the sending units, according to a sequence number assignment rule which is the same as that of the sending party, and then send each sequence number subset to a receiving unit 72;

a receiving unit 72, which is adapted to determine the sliding window according to the sequence number subset sent from the sequence number subset assigning unit of receiving party 71, save the correlation between the sequence number subset and the sliding window, and perform validity detection on a packet sent from the sending unit according to the sliding window and the packet sequence number of the packet after the packet is received.

Figure 8:
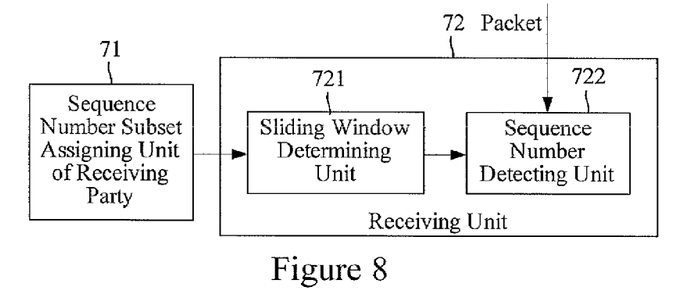
FIG. 8 is a block diagram of the packet receiving device used during the multi-units sending process according to another embodiment of the invention.

FIG. 8 is a block diagram of the packet receiving device used during the multi-units sending process according to another embodiment of the invention. In comparison with the device shown in FIG. 7, the receiving unit 72 includes a sliding window determining unit 721 and a sequence number detecting unit 722, wherein:

the sliding window determining unit 721 is adapted to determine the sliding window according to the sequence number subset sent from the sequence number subset assigning unit of receiving party 71, and send the correlation between the sequence number subset and the sliding window to the sequence number detecting unit 722;

the sequence number detecting unit 722 is adapted to find the sliding window corresponding to the packet sequence number according to the correlation between the sequence number subset and the sliding window saved therein from the sliding window determining unit 721, and then perform validity detection on the packet according to the sliding window and the packet sequence number.

Figure 9:
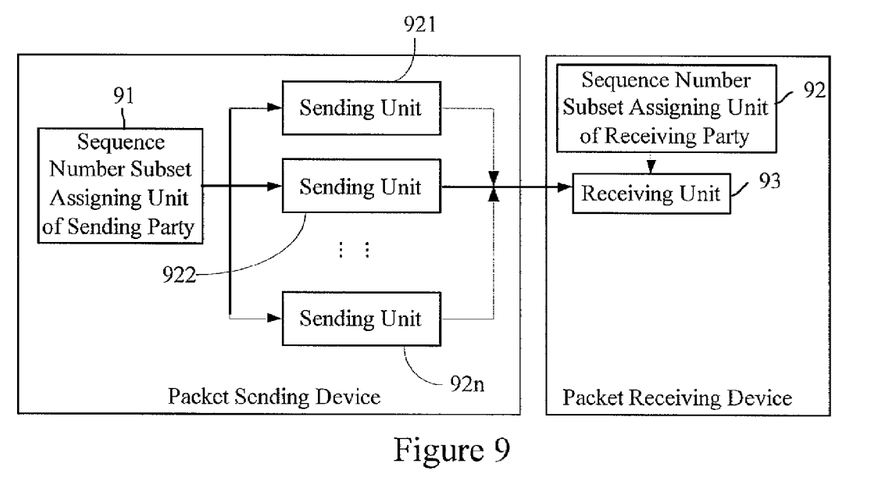
FIG. 9 is a block diagram of a system for detecting packet sequence number during the multi-units sending process according to an embodiment of the invention.

FIG. 9 is a block diagram of a system for detecting packet sequence number during the multi-units sending process according to an embodiment of the invention. As shown in FIG. 9, the system includes a packet sending device and a packet receiving device, wherein the packet sending device includes a sequence number subset assigning unit of sending party 91 and sending units 921-92n, wherein:

the sequence number subset assigning unit of sending party 91 is adapted to divide a sequence number set into non-overlapping sequence number subsets, the number of the subsets being at least equal to the number of the sending units, according to a sequence number assignment rule which is the same as that of the receiving party, and then assign a sequence number subset to each sending unit.

the sending unit 921-92n is adapted to fill a sequence number sent from the sequence number subset assigning unit of sending party 91 into a packet when the packet is to be sent, and then send the packet to the receiving unit 93.

Here, n is an integer greater than 1.

The packet receiving device includes a sequence number subset assigning unit of receiving party 92 and a receiving unit 93, wherein:

the sequence number subset assigning unit of receiving party 92 is adapted to divide a sequence number set into non-overlapping sequence number subsets, the number of the subsets being at least equal to the number of the sending units, according to a sequence number assignment rule which is the same as that of the sending party, and then send each sequence number subset to the receiving unit 93.

the receiving unit 93 is adapted to determine the sliding window according to the sequence number subset sent from the sequence number subset assigning unit of receiving party 92, save the correlation between the sequence number subset and the sliding window, and perform validity detection on a packet sent from any sending unit according to the sliding window and the packet sequence number after the packet is received.

It should be noted that when an apparatus has a packet sending device and a packet receiving device at the same time, the sequence number subset assigning unit of sending party 91 and the sequence number subset assigning unit of receiving party 92 may be the same unit.

Figure 10:
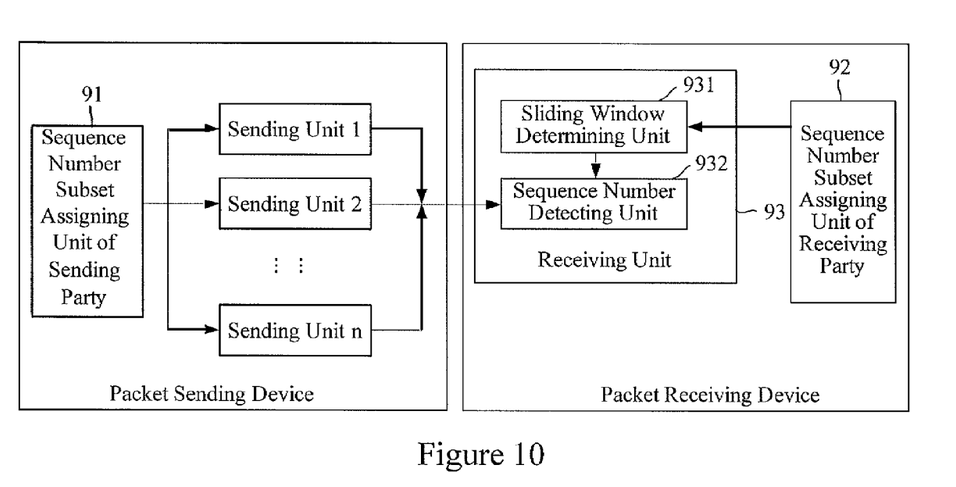
FIG. 10 is a block diagram of the system for detecting packet sequence number during the multi-units sending process according to another embodiment of the invention.

FIG. 10 is a block diagram of the system for detecting packet sequence number during the multi-units sending process according to another embodiment of the invention. As shown in FIG. 10, in comparison with the system shown in FIG. 9, the receiving unit 93 includes a sliding window determining unit 931 and a sequence number detecting unit 932, wherein:

the sliding window determining unit 931 is adapted to determine the sliding window according to a sequence number subset sent from the sequence number subset assigning unit of receiving party 92, and send the correlation between the sequence number subset and the sliding window to the sequence number detecting unit 932; and the sequence number detecting unit 932 is adapted to find the sliding window corresponding to the packet sequence number according to the correlation between the sequence number subset and the sliding window saved therein from the sliding window determining unit 931 after a packet sent from any sending unit is received, and then perform validity detection on the packet according to the sliding window and the packet sequence number.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method for detecting packets during multi-units sending process, wherein all the sequence numbers of the packets are divided into non-overlapping subsets, the number of the subsets being at least equal to the number of units comprised in a sending party; each subset is assigned to a unit of the sending party; and a receiving party records a correlation between each sequence number subset and a sliding window; the method comprises:

filling, by a unit of the sending party, a sequence number from its subset into a packet to be sent, and sending the packet to the receiving party;

determining, by the receiving party, the sliding window corresponding to the sequence number of the packet according to the correlation between the sliding window and the sequence number subset recorded in the receiving party after the packet is received, and performing packet validity detection according to the determined sliding window and the sequence number.

2. The method according to claim 1, wherein, the process of determining the sliding window corresponding to the sequence number of the packet specifically comprises:

searching, by the receiving party, for the sequence number subset to which the sequence number pertains according to the sequence number of the packet, and obtaining the sliding window corresponding to the sequence number subset according to the correlation between the sliding window and the sequence number subset; or computing, by the receiving party, a serial number of the sliding window corresponding to the sequence number of the packet, so as to find the sliding window corresponding to the serial number of the sliding window, when the correlation between the sliding window and the sequence number subset is a correlation between the serial number of the sliding window and the sequence number in the sequence number subset.

3. The method according to claim 1, wherein, the process in which the sequence number is divided into non-overlapping subsets, the number of the subsets being at least equal to the number of units comprised in the sending party, specifically comprises: arranging all of the sequence numbers in turn, and assigning each sequence number to each subset in a round robin mode; and the process of determining the sliding window corresponding to the sequence number of the packet specifically comprises: determining, by the receiving party, that the sliding window corresponding to the sequence number of the packet is a sliding window corresponding to all the subsets jointly.

4. The method according to claim 1, wherein, the process of filling, by the unit of the sending party, the sequence number from its subset into the packet to be sent specifically comprises:

computing, by the unit, a sequence number of a current packet according to a sequence number of a packet sent previously and a relation between two neighboring sequence numbers in the subset in which the sequence number exists, and filling the sequence number of the current packet into the packet to be sent; or selecting, by the unit, a sequence number following the sequence number of the packet sent previously from its sequence number subset, and filling the selected sequence number into the packet to be sent.

5. The method according to claim 1, wherein, the process of performing packet validity detection according to the determined sliding window and the sequence number specifically comprises:

determining that the packet is a valid packet, and marking the sequence number as Received in the sliding window, when the sequence number lies within the sliding window and the sequence number is marked as Not Received on the sliding window;

determining that the packet is an invalid packet and discarding the packet, when the sequence number lies within the sliding window and the sequence number is marked as Received on the sliding window;

determining that the packet is an invalid packet and discarding the packet, when the sequence number lies outside the left border of the sliding window; and determining that the packet is a valid packet, shifting the sliding window to the right to contain the sequence number, and marking the sequence number as Received on the sliding window, when the sequence number does not lie within the sliding window and does not lie outside the left border of the sliding window.

6. A method for detecting packets during multi-units sending process, wherein all of the sequence numbers of packets are divided into non-overlapping subsets, the number of the subsets being at least equal to the number of units comprised in a sending party, and each subset is assigned to a unit of the sending party; the method comprises:

filling, by a unit of the sending party, a sequence number from its subset into a packet to be sent, and sending the packet to a receiving party; and determining, by the receiving party, a sequence number subset in which the sequence number of the packet exists after the packet is received, and performing packet validity detection according to a receiving state of the sequence number subset and the sequence number.

7. A packet sending device used during multi-units sending process, comprising a sequence number subset assigning unit of sending party and at least two sending units, wherein:

the sequence number subset assigning unit of sending party is adapted to divide a sequence number set into non-overlapping sequence number subsets, the number of the subsets being at least equal to the number of the sending units, according to a sequence number assignment rule which is the same as that of a receiving party, and then assign a sequence number subset to each sending unit; and the sending units are adapted to fill a sequence number from the sequence number subset assigned by the sequence number subset assigning unit of sending party into a packet when the packet is to be sent, and then send the packet to a receiving unit.

8. A packet receiving device used during multi-units sending process, comprising a sequence number subset assigning unit of receiving party and a receiving unit, wherein:

the sequence number subset assigning unit of receiving party is adapted to divide a sequence number set into non-overlapping sequence number subsets, the number of the subsets being at least equal to the number of sending units, according to a sequence number assignment rule which is the same as that of a sending party, and then send each sequence number subset to the receiving unit; and the receiving unit is adapted to save a correlation between the sequence number subset and a sliding window according to the sequence number subset sent from the sequence number subset assigning unit of receiving party, and perform validity detection on a packet sent from a sending unit after the packet is received according to the sliding window corresponding to the sequence number of the packet and the sequence number.

9. The device according to claim 8, wherein the receiving unit comprises a sliding window determining unit and a sequence number detecting unit, wherein:

the sliding window determining unit is adapted to determine a sliding window according to the sequence number subset sent from the sequence number subset assigning unit of receiving party, and send the correlation between the sequence number subset and the sliding window to the sequence number detecting unit; and the sequence number detecting unit is adapted to search for a sliding window corresponding to the sequence number of the packet according to the correlation between the sequence number subset and the sliding window saved in the sequence number detecting unit obtained from the sliding window determining unit after a packet sent from the sending unit is received, and then perform validity detection on the packet according to the sliding window and the sequence number of the packet.

10. A system for detecting a packet during multi-units sending process, comprising a packet sending device and a packet receiving device, wherein the packet sending device comprises a sequence number subset assigning unit of sending party and at least two sending units; the packet receiving device comprises a sequence number subset assigning unit of receiving party and a receiving unit; wherein:

the sequence number subset assigning unit of sending party is adapted to divide a sequence number set into non-overlapping sequence number subsets, the number of the subsets being at least equal to the number of the sending units, according to a sequence number assignment rule which is the same as that of a receiving party, and then assign a sequence number subset to each sending unit;

the sending unit is adapted to fill a sequence number from the sequence number subset assigned by the sequence number subset assigning unit of sending party into a packet when the packet is to be sent, and then send the packet to the receiving unit;

the sequence number subset assigning unit of receiving party is adapted to divide a sequence number set into non-overlapping sequence number subsets, the number of the subsets being at least equal to the number of the sending units, according to a sequence number assignment rule which is the same as that of the sending party, and then send each sequence number subset to the receiving unit; and the receiving unit is adapted to save the correlation between the sequence number subset and the sliding window according to the sequence number subset sent from the sequence number subset assigning unit of receiving party, and perform validity detection on a packet according to the sliding window corresponding to the sequence number of the packet and the sequence number after the packet sent from any sending unit is received.

11. The system according to claim 10, wherein the receiving unit comprises a sliding window determining unit and a sequence number detecting unit, wherein:

the sliding window determining unit is adapted to determine a sliding window according to the sequence number subset sent from the sequence number subset assigning unit of receiving party, and send the correlation between the sequence number subset and the sliding window to the sequence number detecting unit; and the sequence number detecting unit is adapted to search for a sliding window corresponding to the sequence number of the packet according to the correlation between the sequence number subset and the sliding window saved in the sequence number detecting unit obtained from the sliding window determining unit after a packet sent from the sending unit is received, and then perform validity detection on the packet according to the sliding window and the sequence number of the packet.

12. A device for detecting a packet during multi-units sending process, comprising a sequence number subset assigning unit, at least two sending units and a receiving unit, wherein:

the sequence number subset assigning unit is adapted to divide a sequence number set into non-overlapping sequence number subsets, the number of the subsets being at least equal to the number of the sending units, and then assign a sequence number subset to each sending unit or send each sequence number subset to the receiving unit;

the sending unit is adapted to fill a sequence number from the sequence number subset assigned by the sequence number subset assigning unit into a packet when the packet is to be sent, and then send the packet to the receiving party; and the receiving unit is adapted to save the correlation between the sequence number subset and the sliding window according to the sequence number subset sent from the sequence number subset assigning unit, and perform validity detection on a packet according to the sliding window corresponding to the sequence number of the packet and the sequence number after the packet from the sending party is received.

* * * * *